United States Patent [19]

Woodruff

[11] Patent Number: 4,529,171
[45] Date of Patent: Jul. 16, 1985

[54] CABLE-GUIDING APPARATUS

[75] Inventor: Roger D. Woodruff, Hebron, Ind.

[73] Assignee: Champion Corporation, Hammond, Ind.

[21] Appl. No.: 415,173

[22] Filed: Sep. 7, 1982

[51] Int. Cl.³ .............................................. B65H 59/00
[52] U.S. Cl. ............................................ 254/134.3 FT
[58] Field of Search ............... 254/134.3 R, 134.3 PA, 254/134.3 FT, 415, 394, 325; 242/157 R

[56] References Cited

U.S. PATENT DOCUMENTS

| 306,952 | 10/1884 | Porritt | 254/415 |
| 307,986 | 11/1884 | Porritt | 254/415 |
| 743,656 | 11/1903 | Nettles et al. | 254/134.3 R |
| 928,766 | 7/1909 | Johnstone | 254/415 |
| 1,805,800 | 5/1931 | Berger | 254/415 |
| 2,650,066 | 8/1953 | Troyer | 254/394 |
| 3,201,090 | 8/1965 | Jones | 254/134.3 FT |
| 3,306,581 | 2/1967 | Miller | 254/134.3 FT |
| 3,858,849 | 1/1975 | Peirce | 254/134.3 R |
| 4,134,574 | 1/1979 | Jean et al. | 254/134.3 R |
| 4,260,119 | 4/1981 | Price | 254/394 |

Primary Examiner—Robert C. Watson
Attorney, Agent, or Firm—McDougall, Hersh & Scott

[57] ABSTRACT

The invention is directed to a system for pulling telephone cable or the like through a conduit, wherein the system includes a truck having a power-driven winch, a winching cable for connection to an end of the telephone cable to be pulled through the conduit, and a mechanism mounted to the truck remote from the winch for guiding the winching cable as same is pulled through the conduit. The improvement in the guiding mechanism comprises a tubular collar dimensioned to receive therethrough the winching cable and the telephone cable, a mechanism for releasably mounting the collar to the truck, and a roller mechanism carried by the tubular collar for arcuately supporting the winching cable and the telephone cable adjacent the collar.

14 Claims, 5 Drawing Figures

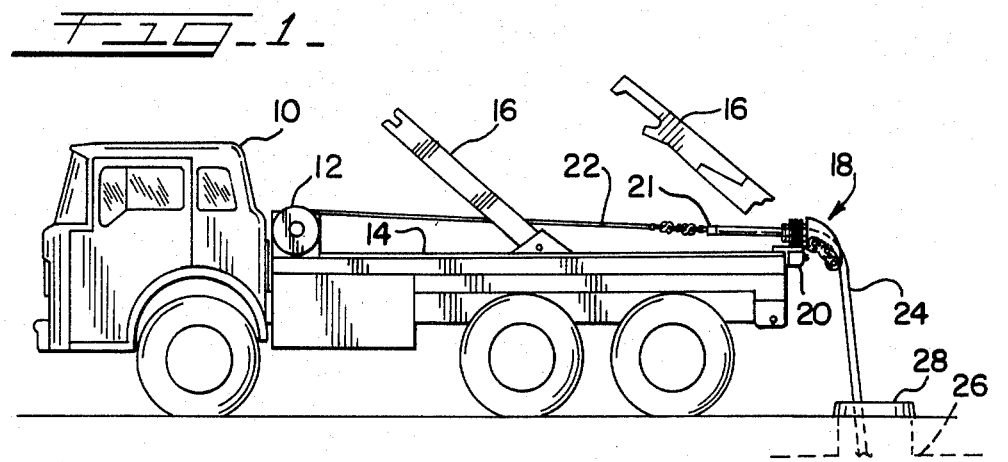
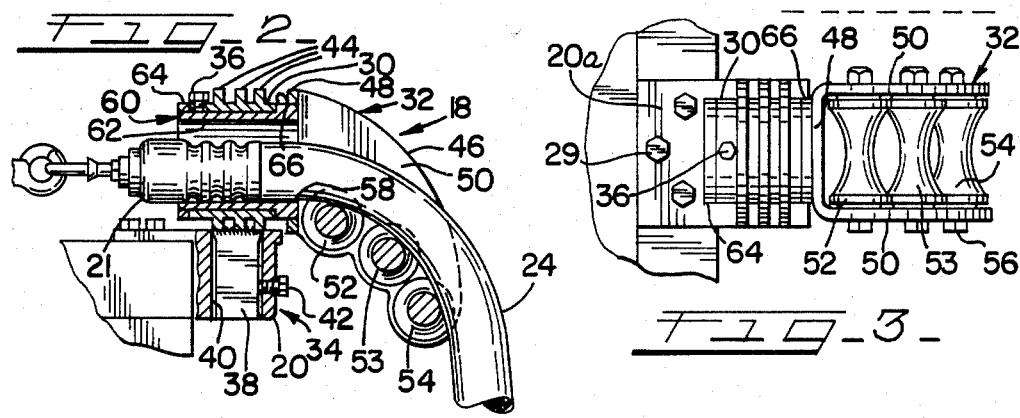
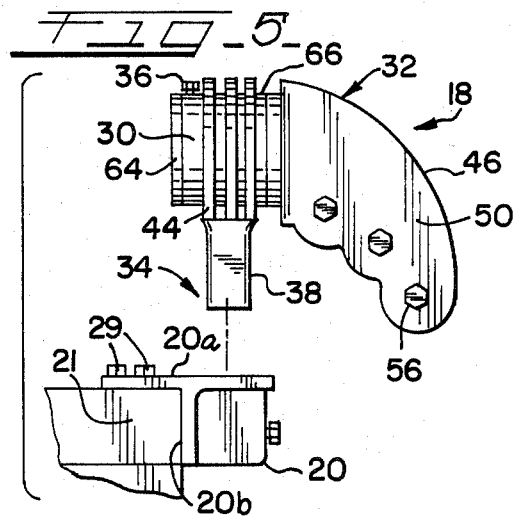
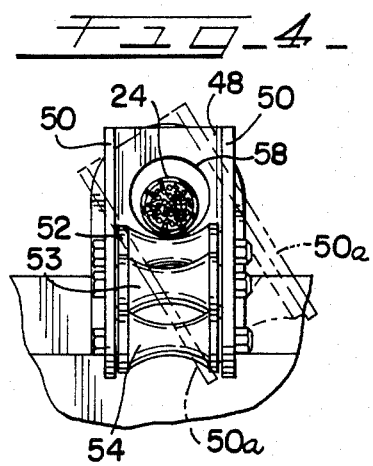

CABLE-GUIDING APPARATUS

BACKGROUND OF THE INVENTION

This invention relates generally to a system for pulling telephone cable or the like through an underground conduit. More specifically the invention relates to an improved cable-guiding apparatus for guiding a cable as it is pulled from an access port of the conduit.

One method typically used to pull a large cable, such as a telephone cable, through an underground conduit or pipe, utilizes a power-driven winch mounted to a truck. The cable from the winch is routed through the section of conduit in which the telephone cable is to be pulled and one end of the winch cable is connected to an end of the telephone cable. The winch is utilized to rewind the cable associated therewith causing the telephone cable to be pulled through the desired section of conduit.

The winch is typically mounted at the front end of the bed of a truck, that is, adjacent the cab, since the winch is driven by the engine of the truck. The truck is parked with the rear end of its bed adjacent and above a manhole or access port to the underground conduit. The winch cable may be supported at the rear of the truck by a conventional pulley having a grooved rim designed to accommodate the diameter of the winch cable. When the end of the winch cable which is attached to the telephone cable approaches the pulley, the winch must be stopped since the pulley cannot accommodate the telephone cable which is substantially larger in diameter than that of the winch cable. If the telephone cable must be pulled further, the truck must be repositioned further away from the access port before further pulling can be accomplished.

Having to move the truck in order to pull the telephone cable perhaps a short remaining distance, such as a few feet, results in inefficiency. Furthermore, it may create additional problems. As the rear of the truck is moved away from the access port, the angle between the cable and the port will be such that the cable will tend to engage the edge of the port, making pulling of the cable difficult or perhaps injuring the cable itself. It is, of course, desired that the cable be pulled through the port without damaging or fraying the cable. Thus, additional measures may have to be taken in order to prevent the cable from engaging the edge of the access port before further pulling can be accomplished.

SUMMARY OF THE INVENTION

It is an object of the present invention to provide a winching system for pulling telephone cable or the like through an underground conduit with an improved cable guide having a configuration which permits the winch cable and the telephone cable to be pulled therethrough.

Another object of the invention is to provide an improved cable guide which can be releasably mounted to the rear end of the bed of the truck having a remotely mounted winch, wherein the cable guide permits the winch cable and the cable being pulled through an underground conduit to pass therethrough.

A still further object of the present invention is to provide an improved cable guide as described above which is free to rotate so that it can accept cables at various angles relative thereto.

This invention is directed to a system for pulling telephone cable or the like through a conduit, wherein the system includes a truck having a power-driven winch, a winching cable connected to an end of the telephone cable to be pulled through the conduit, and a means mounted to the truck remote from the winch for guiding the winching cable as same is pulled through the conduit. This invention is characterized by an improvement in the guiding means which comprises a tubular collar dimensioned to receive therethrough the winching cable and the telephone cable, means for releasably mounting the collar to the truck, and roller means carried by the tubular collar for arcuately supporting the cables adjacent the collar.

BRIEF DESCRIPTION OF THE DRAWINGS

FIG. 1 is a side elevational view showing a truck with a cable winching system which incorporates an embodiment of the present invention.

FIG. 2 is an enlarged fragmentary view illustrating the cable guide of the present invention as shown in FIG. 1 with portions shown cut away for clarity.

FIG. 3 is a top view of the cable guide as shown in FIG. 2.

FIG. 4 is a rear end view of the cable guide as shown in FIG. 2 with an alternate rotated position of the cable guide shown in dashed lines.

FIG. 5 is an exploded view illustrating the cable guide in position to be received by a mounting assembly at the rear of the truck.

DETAILED DESCRIPTION

FIG. 1 illustrates a truck 10 having a powerdriven winch 12 mounted to the front end of bed 14. Arms 16 may be pivotally mounted to the bed of the truck for loading and unloading reels of cable as described in U.S. Pat. No. 3,820,673. An embodiment of a cable guide 18 according to the present invention is releasably secured to the rear end of the truck bed by means of a mounting structure 20. A ferrule 21 crimped to an end of telephone cable 24 facilitates its connection to winch cable 22. As shown in FIG. 1, the telephone cable is being pulled through an underground conduit 26 having an access port or outlet 28. Truck 10 is preferably parked with cable guide 18 sufficiently close to outlet 28 so that the telephone cable 24 does not contact and rub against the edge of the outlet as it exits therefrom.

Referring in particular to FIGS. 2-5, the cable guide 18 includes a tubular collar 30, a roller guide means 32 pivotally carried by collar 30, and a mounting means 34 for removably mounting the guide to the truck 10. Tubular collar 30 is preferably made from a metal such as of structural steel tubing. A bolt 36 is threadedly mounted to the collar to provide a means for preventing roller guiding means 32 from rotating relative to the collar.

The mounting means 34 includes a mounting shaft 38 preferably having a rectangular cross-section and dimensioned to be received within a socket 40 in mounting bracket 20 which is attached to the truck with bolts 29. Mounting bracket 20 may be of a conventional construction such as including a top plate 20a and a perpendicular flange 20b extending therefrom to define an L-shaped channel for mounting to the rear 21 of the truck bed. Shaft 38 and socket 40 are dimensioned such that the shaft cannot rotate within the socket. A bolt 42 is threadedly mounted in bracket 20 so as to engage shaft 38 and lock same to the bracket. In the illustrated embodiment, a plurality of metal plates 44 each have a bore dimensioned to receive tubular collar 30 therethrough. These spaced apart plates reinforce the collar and are welded to the outside of the collar and to mounting shaft 38. Thus, cable guide 18 can be quickly mounted to and removed from the truck.

Roller guide means 32 includes a generally U-shaped bracket 46 having a web 48 and generally arcuate flanges 50. First, second and third rollers 52, 53, and 54, respectively, are pivotally mounted between flanges 50 such as with bolts 56. These rollers preferably have a concave exterior surface to maintain the cable centered relative to the rollers thereby minimizing the likelihood that the cable will contact flanges 50. The rollers are preferably mounted to define an arcuate path which is tangential to bore 58 in web 48. As best seen in FIG. 2, rollers 52-54 arcuately support cable 24 adjacent collar 30 such that the radius of the arc defined by the rollers is substantially greater than the diameter of telephone cable 24. This prevents the cable from being bent too sharply as it is being pulled through the cable guide. Of course, the winch cable 22 is similarly supported by the cable guide until the leading end of the telephone cable enters same.

A tubular assembly 60 includes a tube or sleeve 62 mounted for rotation within collar 30. One end of sleeve 62 is received by bore 58 in web 48 and is welded thereto. The sleeve supports the roller guide means 32 rotatably relative to the collar. Annular rings 64 and 66 mounted to the exterior of sleeve 62 function as stops preventing axial movement of the sleeve relative to the collar.

In FIG. 4, cable guide 18 is shown in solid lines with flanges 50 disposed generally vertically and is shown in dashed lines pivoted generally counter-clockwise such that the flanges 50a form an oblique angle with respect to the vertical. Although FIG. 4 illustrates only one alternative position of the roller guide 32, it will be apparent that the roller guide means can be rotated 360 degrees with respect to collar 30 to any desired angular position. This permits the cable guide to accept a cable at any angle and allows greater flexibility in the positioning of truck 10 relative to outlet 28.

The cable guide according to the present invention is particularly suited for use with a cable installing system such as illustrated in FIG. 1. Should truck 10 be slightly misaligned with respect to outlet 28, that is, such that cable exiting the outlet does not lie within a vertical plane, the cable guide will readily accommodate such misalignments since the roller guide 32 is free to rotate or swivel to accommodate the entry of the cable from any angle.

The cable guide is also advantageous in that it permits telephone cable 24 to be pulled therethrough so that the end of cable 24 can be pulled generally adjacent winch 12. The use of a conventional pulley designed to accommodate winching cable 22 would prevent the telephone cable from being pulled beyond the pulley. Thus, the length of telephone cable which can be pulled outside outlet 28 without requiring truck 10 to be repositioned is substantially greater with the cable guide of the present invention than with a conventional pulley. The cable guide according to the present invention cooperates with a vehicle-mounted winching system to provide greater flexibility and efficiency in pulling telephone cables through underground conduits.

Although an emboidment of the present invention has been described above and illustrated in the drawings, the scope of the present invention is defined in the claims appended hereto.

What is claimed is:

1. In a system for pulling telephone cable or the like through an underground conduit, wherein the system includes a truck having a power-driven winch, a winching cable for connection to an end of said telephone cable to be pulled through the conduit, and a means mounted to said truck remote from said winch for guiding said winching cable as same is pulled through said conduit, the improvement in said guiding means comprising a tubular collar dimensioned to receive therethrough said winching cable and said telephone cable, means for releasably mounting said collar to said truck, the releasable mounting means includes a mounting bracket attached to said truck defining a socket therein and a shaft coupled to said collar dimensioned to be received within said socket, a plurality of spaced apart plates each having a hole dimensioned to receive said collar therethrough, said plates attached to said collar, and said shaft attached to said plates wherein said plates reinforce the collar and couple said collar with said shaft, and roller means carried by said tubular collar for arcuately supporting said winching cable and said telephone cable adjacent said tubular collar, wherein said guiding means permits said telephone cable to be pulled therethrough so that the end of the telephone cable can be pulled adjacent said winch.

2. In a system for pulling telephone cable or the like through an underground conduit, wherein the system includes a truck having a power-driven winch, a winching cable for connection to an end of said telephone cable to be pulled through the conduit, and a means mounted to said truck remote from said winch for guiding said winching cable as same is pulled through said conduit, the improvement in said guiding means comprising a tubular collar dimensioned to receive therethrough said winching cable and said telephone cable, means for releasably mounting said collar to said truck, which releasably mounting means includes a mounting bracket adapted for attachment to said truck defining a socket therein and a shaft coupled to said collar dimensioned to be received within said socket, and roller means carried by said tubular collar for arcuately supporting said winching cable and said telephone cable adjacent said tubular collar, wherein said guiding means permits said telephone cable to be pulled therethrough so that the end of the telephone cable can be pulled adjacent said winch, and further comprising a plurality of spaced apart plates each having a hole dimensioned to receive said collar therethrough, said plates attached to said collar, and said shaft attached to said plates wherein said plates reinforce the collar and couple said collar with said shaft.

3. The improvement in accordance with claim 2 wherein said roller means includes a generally U-shaped bracket including a web and first and second flanges extending from said web, and a plurality of rollers pivotally mounted between said first and second flanges for supporting and guiding said winching cable and said telephone cable.

4. The improvement in accordance with claim 3 wherein said web defines an aperture aligned with said tubular collar and wherein said rollers are aligned with respect to said tubular collar to support said cable about an arcuate path.

5. The improvement in accordance with claim 4 wherein said rollers define an arcuate path which is tangential to said collar.

6. The improvement in accordance with claim 4 wherein said rollers have a concave supporting surface which maintains said cable centered with respect to the ends of said rollers.

7. The improvement in accordance with claim 2 wherein said roller means is mounted to said collar so that the roller means rotates relative to the collar.

8. The improvement in accordance with claim 7 wherein said roller means includes a sleeve dimensioned to be received within said tubular collar, said U-shaped bracket mounted to said sleeve, and means mounted to said sleeve for preventing axial movement of said sleeve with respect to said tubular collar.

9. The improvement in accordance with claim 8 wherein said roller means includes a sleeve dimensioned to be received within said tubular collar, said U-shaped bracket mounted to said sleeve, and means mounted to said sleeve for preventing axial movement of said sleeve with respect to said tubular collar.

10. The improvement according to claim 8 wherein said means for limiting axial movement includes at least one annular abutment member mounted to said sleeve disposed to engage said tubular collar.

11. The improvement in accordance with claim 3 wherein said roller means is mounted to said collar so that the roller means rotates relative to the collar.

12. The improvement in accordance with claim 11 wherein said roller means includes a sleeve dimensioned to be received within said tubular collar, said U-shaped bracket mounted to said sleeve, and means mounted to said sleeve for preventing axial movement of said sleeve with respect to said tubular collar.

13. The improvement in accordance with claim 12 wherein said roller means includes a sleeve dimensioned to be received within said tubular collar, said U-shaped bracket mounted to said sleeve, and means mounted to said sleeve for preventing axial movement of said sleeve with respect to said tubular collar.

14. The improvement according to claim 12 wherein said means for limiting axial movement includes at least one annular abutment member mounted to said sleeve disposed to engage said tubular collar.

* * * * *